(12) United States Patent
Blondelet et al.

(10) Patent No.: US 6,176,502 B1
(45) Date of Patent: Jan. 23, 2001

(54) TORSION AXLE

(75) Inventors: Michel Blondelet, Le-Crest; Philippe Jean, Beaumont, both of (FR)

(73) Assignee: Compagnie Generale des Etablissements Michelin-Michelin & Cie, Clermont-Ferrand Cedex (FR)

( * ) Notice: Under 35 U.S.C. 154(b), the term of this patent shall be extended for 0 days.

(21) Appl. No.: 09/294,577

(22) Filed: Apr. 20, 1999

(30) Foreign Application Priority Data

Apr. 22, 1998 (FR) .................................................. 98 05138

(51) Int. Cl.$^7$ .................................................. B60G 11/00
(52) U.S. Cl. .................................................. 280/124.128
(58) Field of Search ...................... 280/124.128, 124.153, 280/124.166, 679, 680

(56) References Cited

U.S. PATENT DOCUMENTS

| | | |
|---|---|---|
| 3,419,101 | 12/1968 | Allison . |
| 4,046,402 | * 9/1977 | Allison ................................. 280/674 |
| 4,556,238 | * 12/1985 | Matschinsky ........................ 280/701 |
| 4,787,680 | 11/1988 | Bonjean et al. . |
| 5,215,329 | * 6/1993 | Santo ................................... 280/723 |

FOREIGN PATENT DOCUMENTS

| | | |
|---|---|---|
| 19533479 | 3/1997 | (DE) . |
| 0114790 | 8/1984 | (EP) . |
| 04224413 | 8/1992 | (JP) . |
| 06239121 | 8/1994 | (JP) . |

* cited by examiner

*Primary Examiner*—Paul N. Dickson
*Assistant Examiner*—Faye M. Fleming
(74) *Attorney, Agent, or Firm*—Baker Botts L.L.P.

(57) ABSTRACT

A torsion axle for a vehicle, said axle having two arms and a cross member having a transverse axis parallel to the transverse direction, the cross member having a free edge at each of its lateral ends, the arms being connected to each of the ends of the cross member, each of said arms being designed to be attached to the body by a joint on the body, so as to define for each arm an axis coupling the arm on the body, the joint allowing a disalignment of the axes of coupling in relation to each other, each of the arms being designed to support a wheel, the cross member providing a torsion axis on which the arms swing in relation to each other, and the cross member being connected to each of the arms at each of its lateral ends by at least three ball joints, allowing a free twisting of the free edges of the cross member relative to the arms.

11 Claims, 8 Drawing Sheets

TORSION AXLE

BACKGROUND OF INVENTION

The invention concerns vehicle suspensions. In particular, the invention relates to an axle connecting two wheels, while performing an antiroll function (also called anticamber function). The invention still more specifically relates to the category of axles that embody two suspension arms, one end of which is intended to support a wheel and the other end of which is hinged on the body of the vehicle, and that further embody a cross member connecting the two suspension arms.

Several variants of these axles are known. The cross member is sometimes mounted on the axis coupling the arms on the body, other times it is mounted in an intermediate position between the spindle axis and the axis coupling the arms on the body, and still other times it is mounted on the spindle axis, or slightly beyond the spindles, whether or not crossing a line intersecting the spindle axis and intersecting the axis coupling the arms on the body, notably, depending on the elastokinematic characteristics it is desired to impart to the axle. This type of axle is commonly found at the rear end of passenger cars. It is known that the position of the cross member, that is, its distance from the axis coupling the arms on the body, determines the kinematics of camber and wheel alignment, that is, the variation of camber and wheel alignment as a function of the roll angle. With initial camber and dis-alignment there is no kinematic variation of camber and wheel alignment if the relative axis of rotation of the arms in relation to each other (that is, in general, the axis of the cross member) is in the axis of coupling on the body. Therefore, the handling of the vehicle is influenced by the position of the cross member.

Independent wheel suspensions are not considered here, sometimes presenting in their trailing arm variants a sort of perfectly rigid cross member, that is, indeformable under the effect of working stresses. Such a cross member is always placed on the axis coupling the arms on the body, and the arms are rotatably mounted on the cross member. Such a cross member does not affect the antiroll characteristics of the suspension and the axle in question cannot be described as torsional.

The invention concerns torsion axles, that is, deformable axles, and whose deformation or, in general, the torsional stress of whose cross member contributes to the characteristics of antiroll resistance of the wheel assembly. In that case, the cross member, taken as a whole, undergoes a relative rotation of its axial ends on a transverse axis.

Such a cross member is dimensioned to be very rigid on bending. It helps strictly maintain the plane of the wheel when the suspension arm in turn is subjected to bending and torsional stress by the crosswise transfers of loads. Such stresses are due to the transverse adherence of the tire on the road and can become very considerable on turns negotiated at high speed. In other words, the cross member helps prevent undesirable variation of camber of the wheel or steering of the wheel or at least assists in strictly controlling them, so that they will remain within acceptable limits, or so that they will be controlled and not suffered. Such a cross member, if designed with the sole aim of correctly containing wheel steering and wheel camber, has too high a torsional rigidity. This is why excess torsional rigidity in general is dealt with by adopting an open-section cross member.

Another solution is known for rendering such a cross member less rigid on torsion, while maintaining its bending strength at a high level. U.S. Pat. No. 4,787,680 can be considered in this connection. Unfortunately, such a design is satisfactory only when a sufficient space is available for installing the specific area of the cross member whose section is suited to reducing the torsional rigidity. In fact, the installation of suspension arms and their joints on the body requires a transverse space practically independent of the size of the vehicle. Hence, the space available for said specific area diminishes with the track of the vehicle much faster than proportionally.

In other applications in common use, the cross member is formed by an open section of lower torsional rigidity. It is to be observed, however, that the linkage of such a cross member to the arms raises numerous problems of endurance. The linkage zone is the seat of a high stress concentration, which leads to reinforcing it, for example, by welding additional coupling plates, or by increasing inertia at the end of the cross member. In that case, the part of the cross member really used to control the roll is reduced to a portion roughly lying between the plates or additional reinforcing elements.

That is why the control of the plane of the wheels (geometric aspect) and control of body movements (flexibility aspect, wheel clearance as a function of transfers of loads) are very often treated separately. An antiroll bar separate from the suspension arms guiding and controlling the plane of the wheel steering gear very commonly endows the axle with a roll resistance added to that coming from the suspension springs and to that coming from a cross member rigidly coupled to the suspension arms.

It is observed in the present state of the art that the choice between independent wheels and torsion axle raises some ill-resolved difficulties. It is difficult to compromise the different demands between torsion and bending characteristics.

If it is decided to adopt a wheel assembly of the type with torsion axle rather than with independent wheels, the design of such an axle must satisfy rather contradictory requirements. It is necessary to endow the axle with sufficient bending strength, to achieve a good maintenance of wheel planes, in order to avoid steering of the wheels that is too great or occurring in an undesirable direction on severe transverse stresses. But it is necessary at the same time for the wheel arms to be able to clear one another relatively independently, while preferably having an elastic return to the position where the arms are parallel to each other. This is the antiroll function characteristic of the axle mentioned above. In most known torsion axle solutions, the torsional cross member, which is rigid on bending, is rigidly fixed to the arms, for example, by welding, in order to ensure holding of the wheels.

This type of torsion axle should offer, for small sedans, for example, sufficient bending strength (minimum 45000 mN/rad/m for an arm 250 mm long between the axis of coupling on the body and the axis of the spindle under convergent stresses) combined with a sufficient capacity for torsional elastic deformation (resistance between 250 and 500 mN/rad/m for an arm of the length indicated above), the values being only indicative and depending, in fact, on the vehicle, the height of its center of gravity, the track and the type of handling that the designer wishes to impart to the vehicle.

These types of solutions present great difficulties with regard to the compromise and adjustment between bending strength and torsional rigidity. In fact, the stress concentrations in the housing between cross member and arms require, in order to maintain them at a tolerable level, not only lengthening the arms, thus diminishing the torsional stress angles of the cross member, but also strengthening the housing with added reinforcements. The latter artificially increase torsional rigidity of the section.

SUMMARY OF THE INVENTION

The objective of this invention is to better reconcile these conflicting demands, that is, to endow the axle with substantial bending strength, while affording it a characteristic antiroll function, the level of which can be adjusted as freely as possible, notably, so as to permit the use of such an axle on a very wide range of vehicles. In particular, the invention is intended to render the use of an antiroll bar possibly superfluous by providing an antiroll function independent of that afforded by the suspension elements of each of the wheels of an axle.

The invention proposes a torsion axle for a vehicle, said axle having two trailing arms and a cross member having a transverse axis parallel to the transverse direction, said cross member having a free edge at each of its lateral ends, said arms being connected to each of the ends of the cross member, each of said arms being designed to be attached to the body by a joint on the body, so as to define for each arm an axis coupling the arm on the body, said joint allowing a disalignment of said coupling axes in relation to each other, each of said arms being designed to support a wheel, said cross member providing a torsion axis on which the arms swing in relation to each other, and the cross member being connected to each of the arms at its lateral ends by at least three link means forming ball joints and allowing a twisting of said free edge.

The term "transverse" direction means here a direction parallel to the width of the vehicle, that is, parallel, to the large dimension of the cross member. The axis of the cross member is parallel to that transverse direction. In the present specification, "torsion axis" refers to a virtual axis of the axle, roughly parallel to the axis of the cross member, on which the suspension arms present the relative clearance specific to a stress on roll of the vehicle or, in general, specific to a nonidentical stress of the suspension arms, for example, when a single wheel crosses an obstacle in a straight line. "Ball joint" means an element securing an interlocking of two parts, while enabling them to swing in all directions around a relative center of rotation, at least for relatively narrow swing angles. Two main categories are known. There are mechanical ball joints, which are axisymmetric, permitting relatively wide angles, no play other than the degree of swing/rotation freedom between the parts joined. Very especially in the field of automobile suspensions, elastomeric ball joints are also known, which rather form pseudojoints having the characteristic of being friction-free, in contrast to the former, which present a certain noninfinite rigidity, so that, in addition to the relative swinging sought, they make possible a certain play in relative positioning, the play depending on said rigidity, which does not have to be isotropic. Other types of pseudojoints can be used, like a slender bar with local thinning to define the hinge point.

DESCRIPTION OF THE DRAWINGS

The invention will be better understood by the description which follows of the different variants and different working details of a rear axle for passenger cars. These examples are given nonlimitatively and are illustrated by the attached drawings in which.

DESCRIPTION OF PREFERRED EMBODIMENTS

In the different figures, the same references are used to designate parts that are similar or appreciably fulfill the same function. The references accompanied by a suffix "—x" generically refer to all embodiments and can be accompanied by a suffix "—A" or "—B" or "—C" (etc.), when referring more specifically to any of the embodiments.

In the embodiments, a rear axle 1x with suspension trailing arms 2 is connected to a cross member 3x. Each suspension arm 2 is connected to the body by a joint 4 forming an elastic link. That joint, which in itself is well known, defines for each arm a coupling axis $L_1$, $L_2$ (that is, an axis of clearance of the arm 2 in relation to the body). In order to allow for the deformations required by torsion of the axle, those joints make possible a disalignment of the coupling axes $L_1$, $L_2$. Elastomer joints are particularly suitable. The suspension arms 2 carry a spindle on the side opposite the link to the body. Each spindle is designed to receive a wheel 5. The cross member 3x fulfills an antiroll function.

Figure 1:
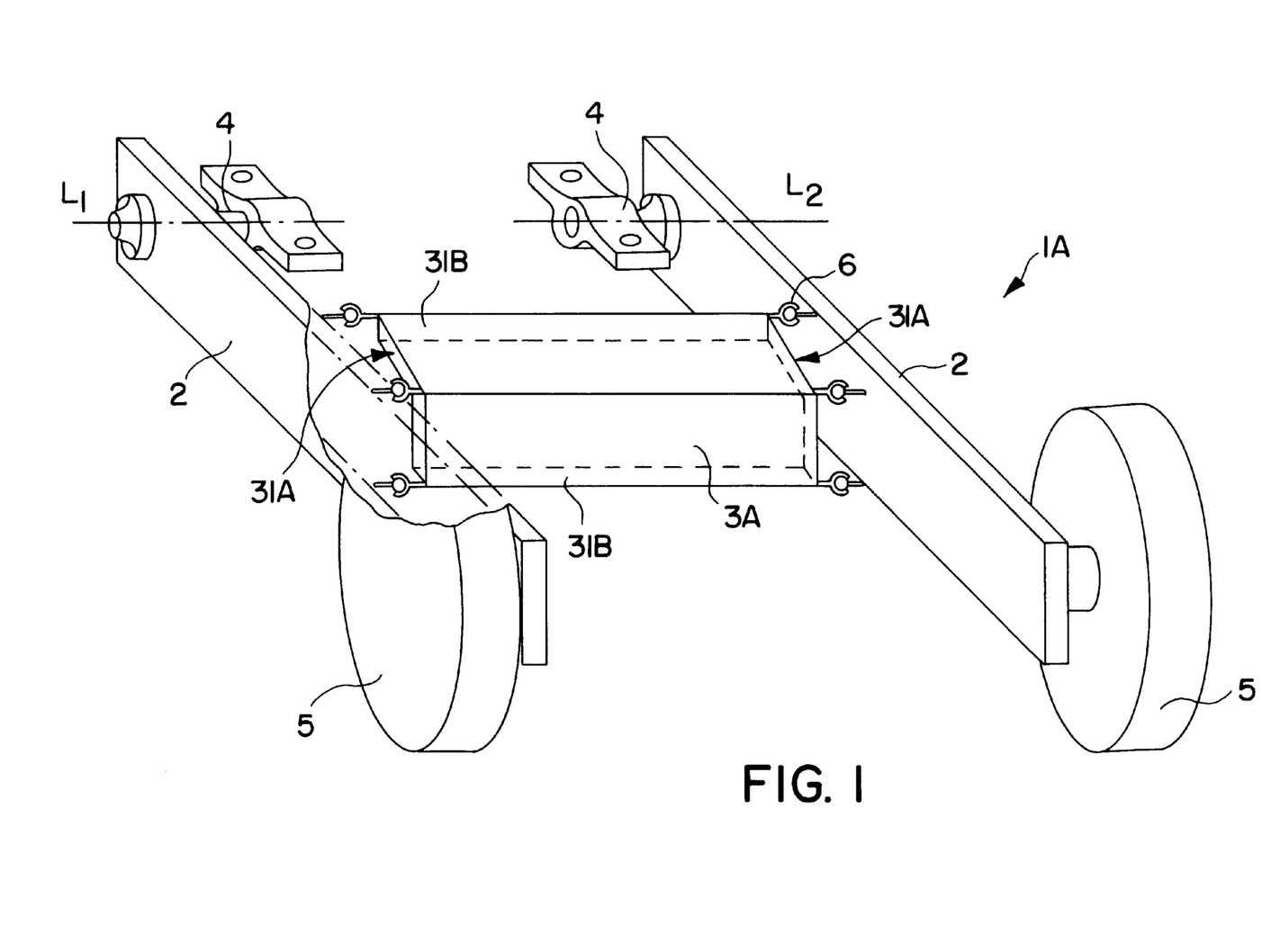
FIG. 1 shows a first variant of the axle.

The connection of the cross member to each of the suspension arms is secured by linkage means 6x forming ball joints. In FIG. 1, there are three ball joints 6 on each side of a V-shaped cross member 3, the ball joints being situated at the ends of the V and in the center of the latter.

Due to the ball joints, a degree of freedom of movement is provided between the ends of the cross member and the arms. A twisting of the cross member is possible. The coupling parts (elastomer here) have the function of dealing with the problem of stress concentration mentioned above, by allowing a relative displacement of the end of the cross member and arm. Notably, the coupling parts allow a relative movement of the edges 31B of the section, in the case of a beam consisting of an open section. The twisting allowed and controlled by the ball joints helps improve greatly the endurance of the link of the cross member to the arms, in relation to the housings commonly found, which moreover often necessitate addition of reinforcing parts 99 (see the axle 9 representing the state of the art in FIGS. 11A and 11B) in the housing, notably, for cross members very much offset from the axis coupling the axle on the body.

Figure 2:
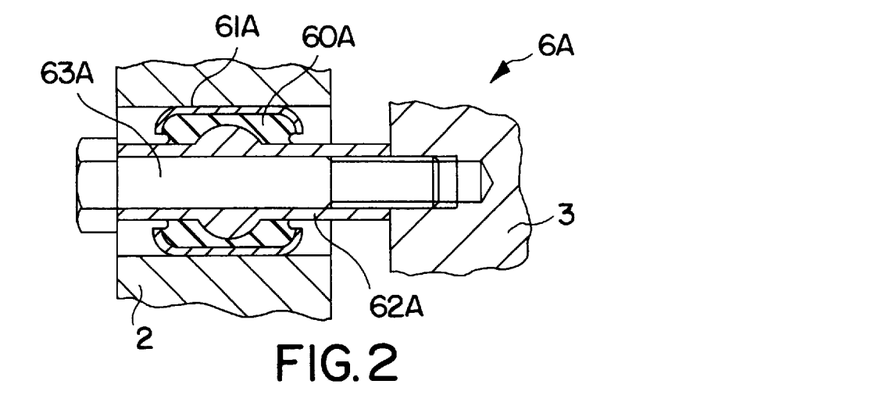
FIG. 2 is a detail of one of the links between cross member and arms.
Figure 3:
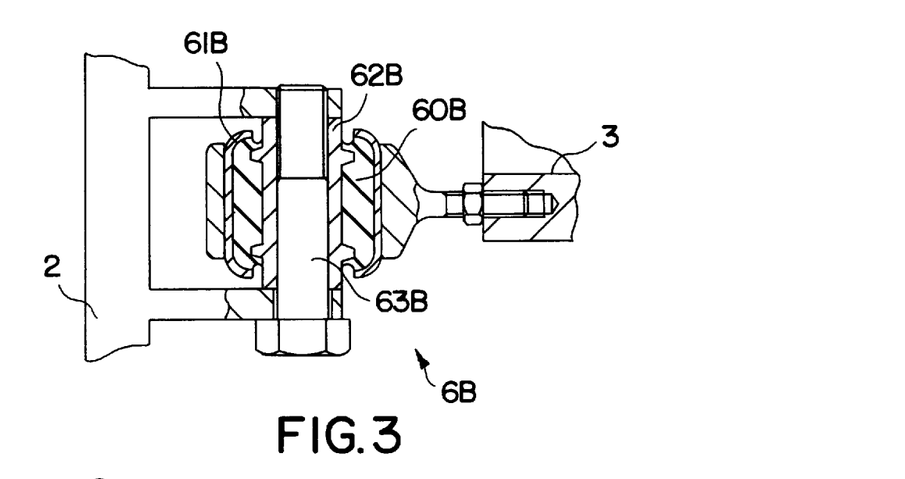
FIG. 3 is a detail of a working variant of one of the links between cross member and arms.

In an example illustrating this invention, the ball joints 6x are of the friction-free type; they couple parts whose degree of freedom is provided by the elastomer. In addition to the absence of friction, this type of ball joint has the advantage of being able to modulate the strength of the elastomer and, therefore, the resistance to the relative movement of the coupled parts. FIGS. 2 and 3 illustrate in detail two variants. In FIGS. 2 and 3, elastomer rings 60A, 60B (circular parts here) adhered to metal collars 61A, 61B and 62A, 62B, for example, at the time of vulcanization of the elastomer rings. The variants are distinguished essentially by the orientation of the center line 63A, 63B of ball joints 6A, 6B in relation to the axis of the cross member 3; the ball joint 6A is mounted on axis 63A parallel to the axis of the cross member 3, while the ball joint 6B is mounted on the axis 63B perpendicular to the axis of the cross member 3. The choice of either of the positions depends on the resistance and strength characteristics it is desired to impart and influences control of the attitude of the wheel plane, as will be described below.

Figure 4:
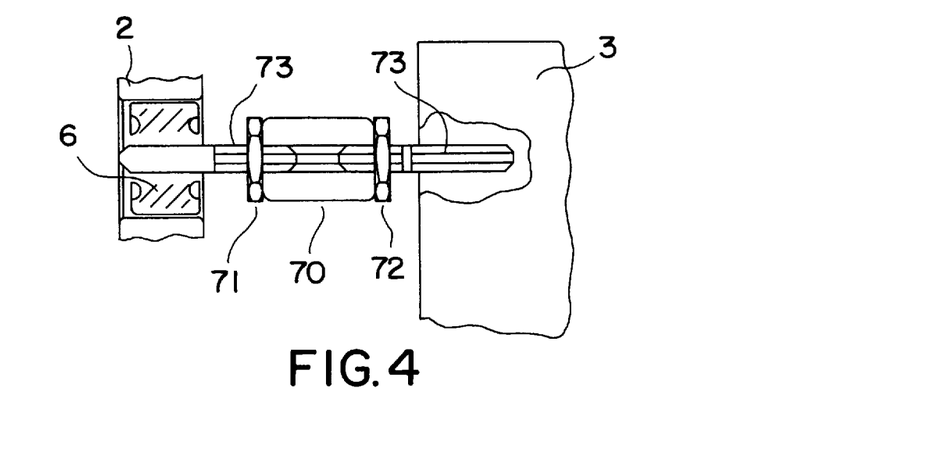
FIG. 4 is a detail of a working variant of one of the links between cross member and arms.

In FIG. 4, the link means 6 are mounted on the cross member by two threaded rods 73 with opposite pitches, connected by a sleeve 70 and locknuts 71, 72. Thus, an axle can be made, at least one of the link means of at least one of the sides of which is mounted by a means of adjustment for regulating the relative crosswise positioning of the arm or arms on the cross member, so as to be able to regulate the attitude of the plane of each wheel. The adjustment is made in the same way as is well known, for example, for adjusting steering rods.

The elastomer joints can be of variable stiffness, according to their directions, on a plane perpendicular to the axis of the cross member. It is sufficient, for example, to mold cavities inside the elastomer, the different adequate means being well known to the expert.

Figure 5:
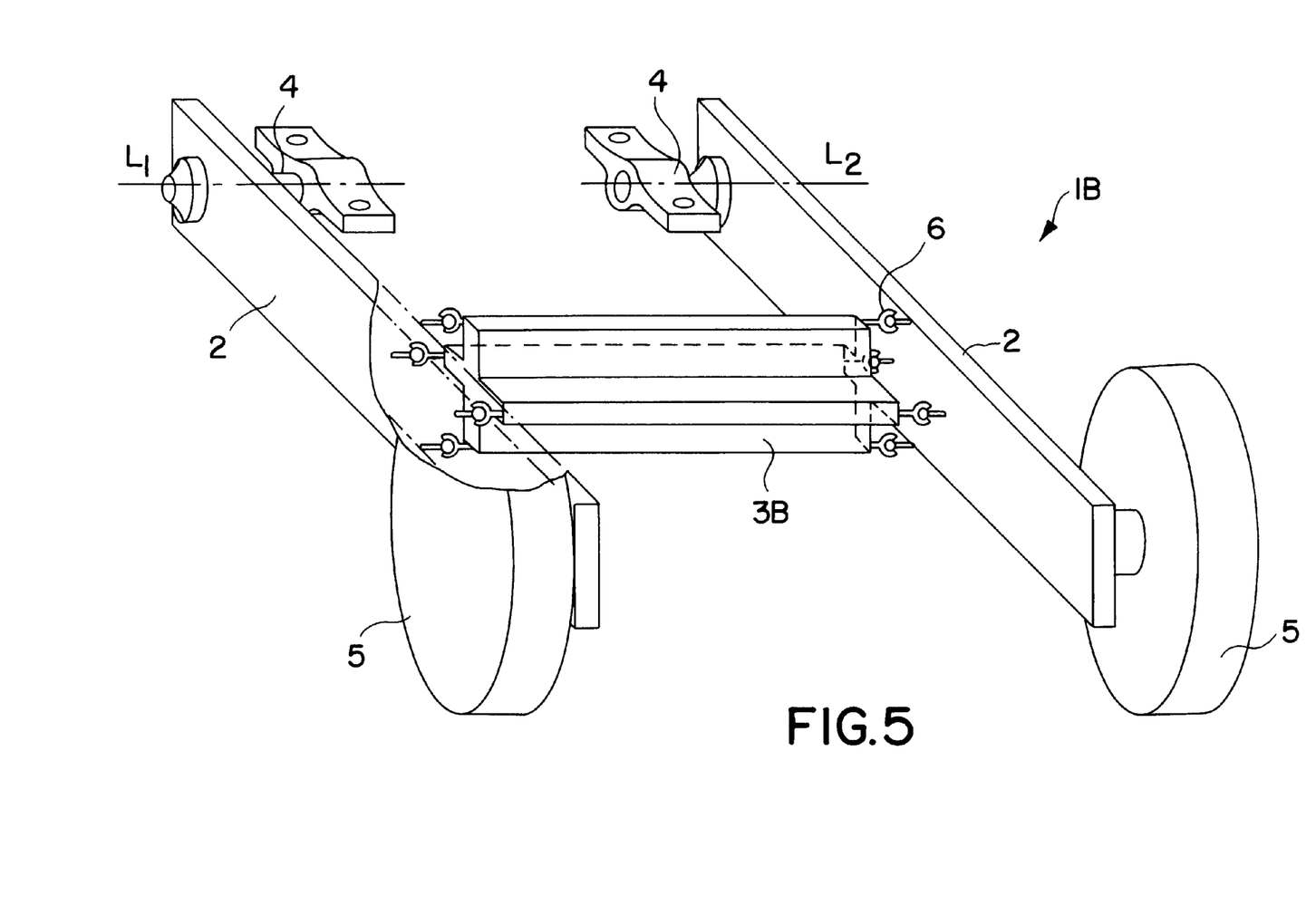
FIG. 5 shows a second variant of the axle.

In FIG. 5, a cross member 3B is formed essentially by a cross-shaped section. It can be connected to the arms on each side, for example, by at least three ball joints 6B and the fourth ball joint, if any, being a similar one or ball joint 6A. This type of cross member, whose section is closed, twists under the effect of torsion. This type of cross member is used when it is sought above all to lighten the axle, without looking for appreciable variations in the wheel plane.

Figure 6:
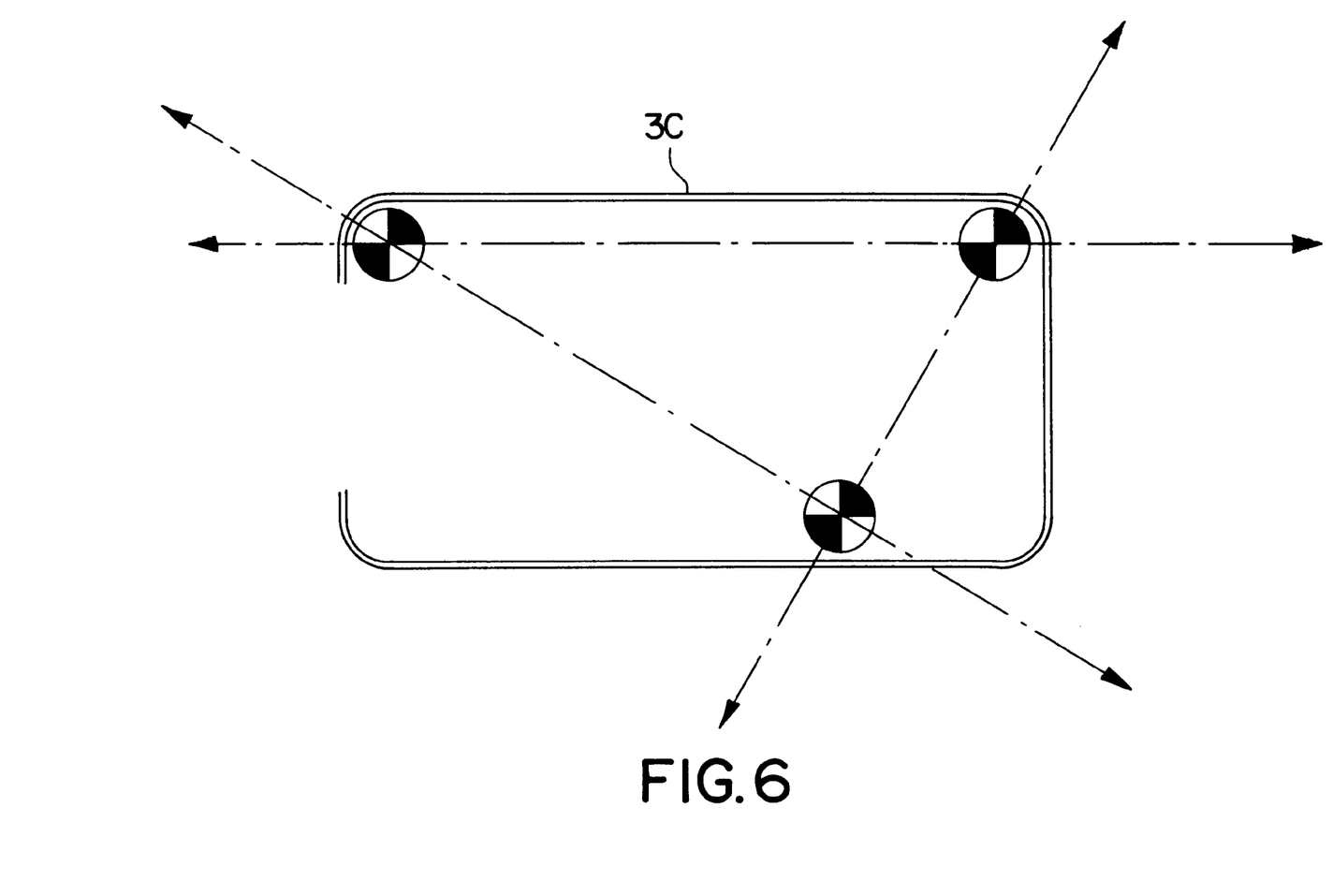
FIG. 6 illustrates the installation of linkage means between cross member and arms.

According to one aspect of the present invention, illustrated by means of FIG. 6, said elastomer joints are oriented so as to let their axes be moved with least stress relative to one another in directions indicated by straight lines connecting them in a plane perpendicular to the axis of the cross member. If a joint of type 6B is adopted, its axis 63B will be placed preferably along a line represented by dots and dashes in FIG. 6. If a joint of type 6A is adopted, then it is preferably nonisotropic, its direction of slight radial rigidity (radial being considered relative to axis 63A) being placed preferably along a line represented by dots and dashes in FIG. 6. Very particularly advantageous twisting of the free edge of the cross member are thereby obtained.

It can be seen that cross members 3A, 3C, 3D, 3E and 3F are formed essentially by an open section, so that each of these cross members, seen in a plane perpendicular to its axis, presents a slit requiring a predetermined azimuth on its axis in the linkage of said cross member to said arms. The orientation of the cross member and the relative position of the ball joints, in relation to the cross members and to the arms, are chosen by trial and error so as to adjust the range of variation of camber (variation of the wheel plane) resulting from twisting due to torsion of the cross member.

Figure 7:
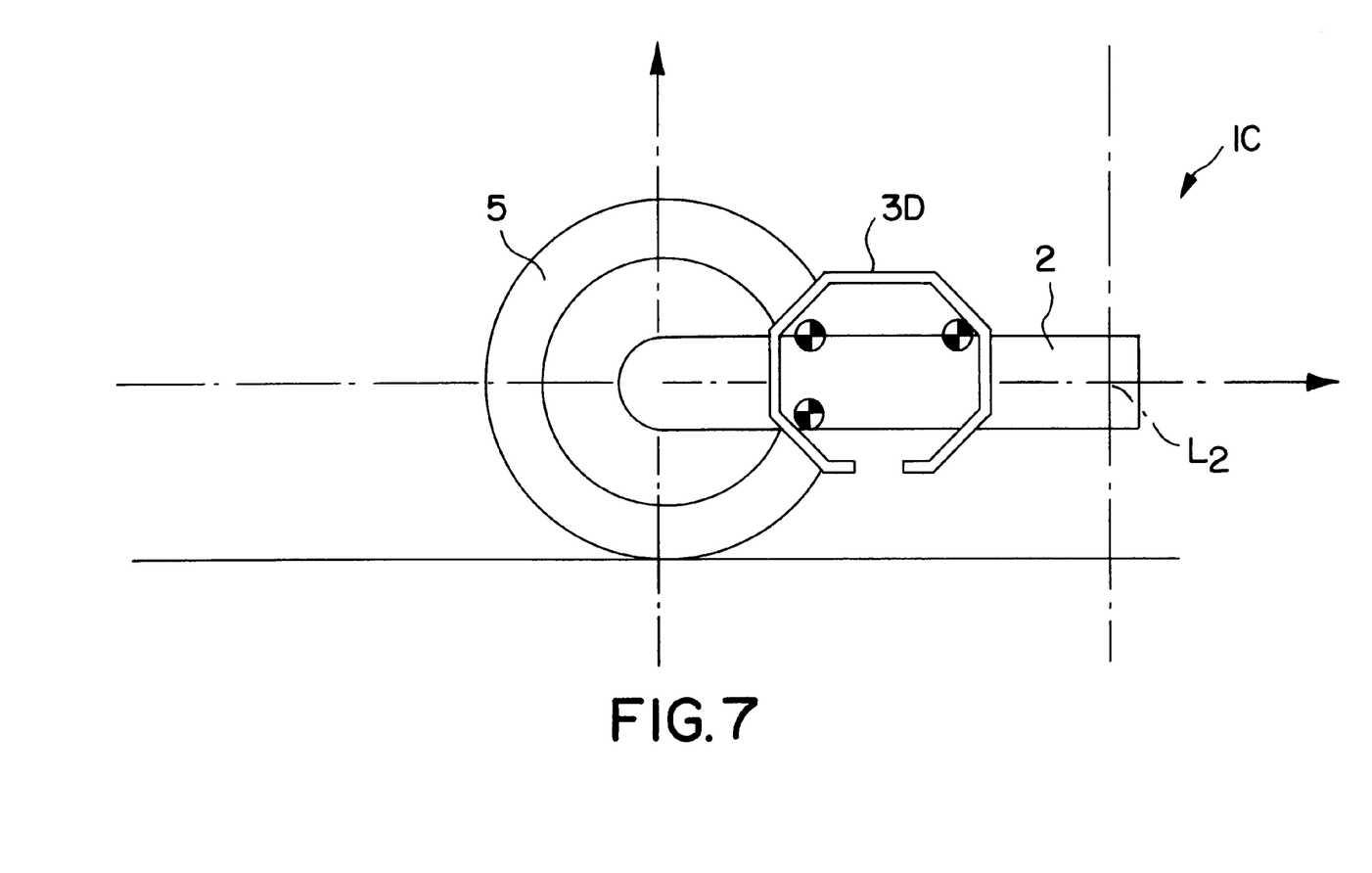
FIG. 7 is a schematic side view of another variant of the axle.

It was found that, according to one of the possibilities, for the tire to remain appreciably perpendicular to the road, it is advantageous, considering the forward and backward directions of the vehicle, to direct the slit toward the road and to place two linkage means on top, one linkage means being placed toward the road and backward, as represented in FIG. 7.

Figure 8:
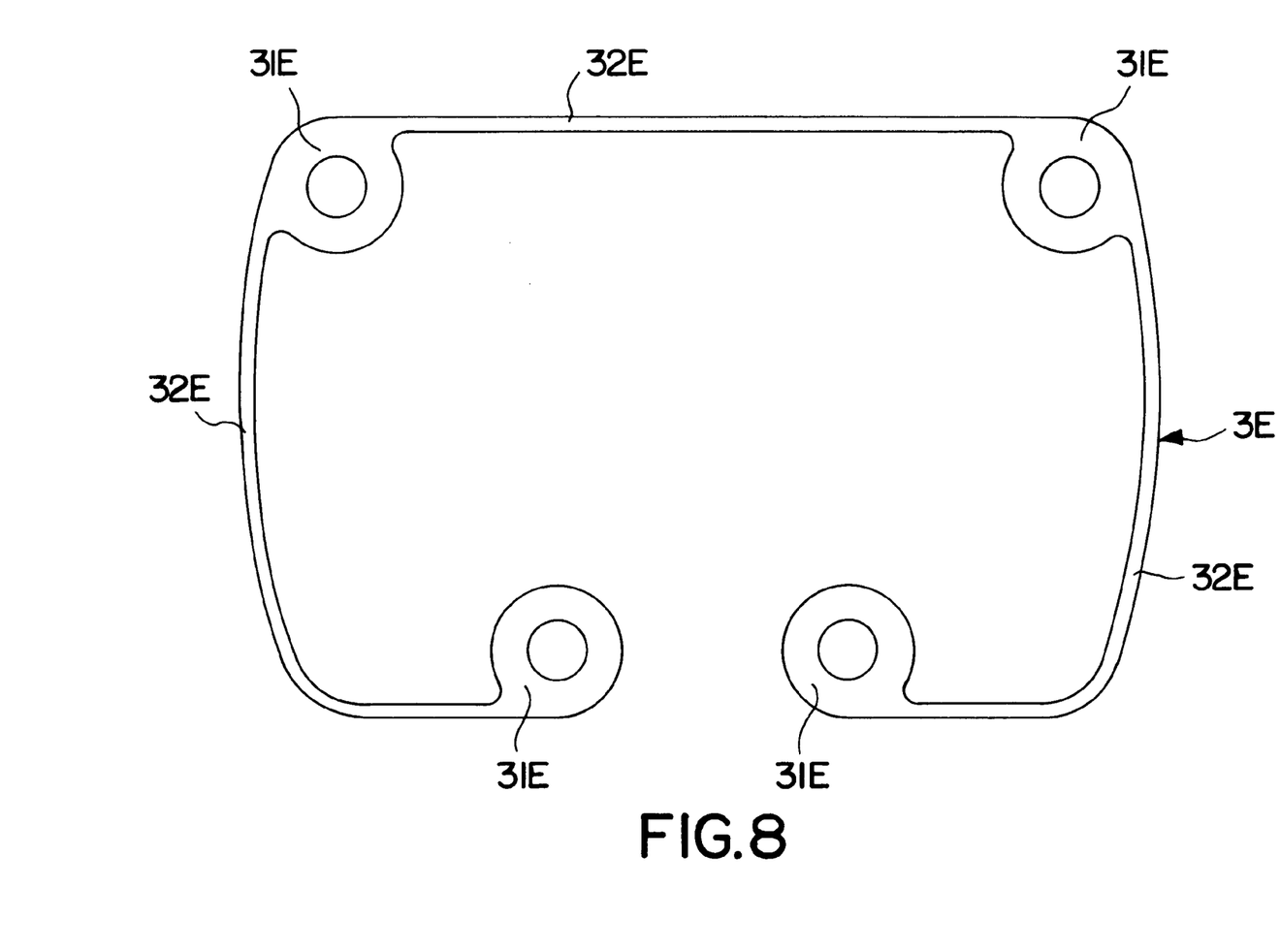
FIG. 8 illustrates another variant of a cross member.
Figure 9A:
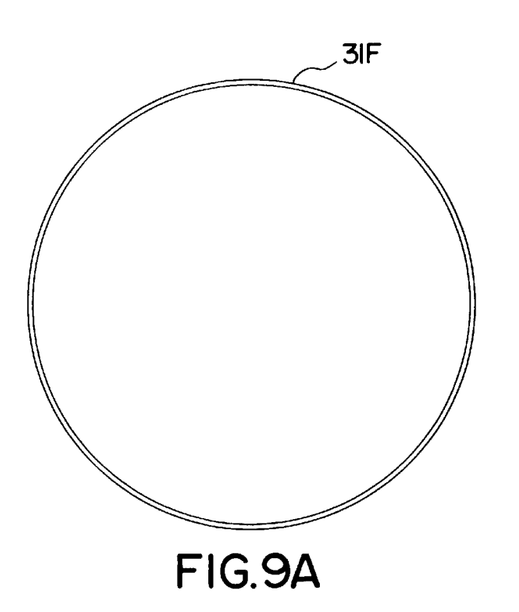
FIGS. 9A and 9B illustrate the manufacture of another cross member variant.
Figure 9B:
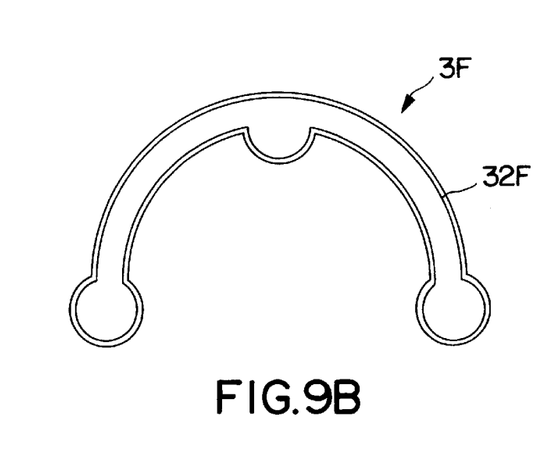

In FIG. 8, an open section 3E can be seen, consisting of several closed sections connected to each other by cores 32E. It is advantageous to make such a cross member of drawn aluminum. In FIG. 8A, it is seen that one can start with a tube 31F, deform it in any suitable way to flatten it and thus create a suitable open section 3F.

Figure 10A:
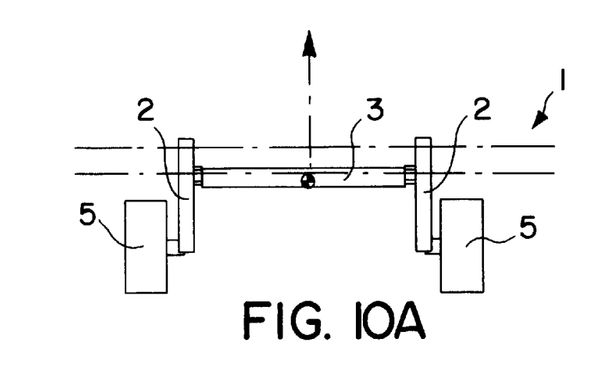
FIGS. 10A and 10B illustrate the torsional deformation of an axle according to the invention.
Figure 10B:
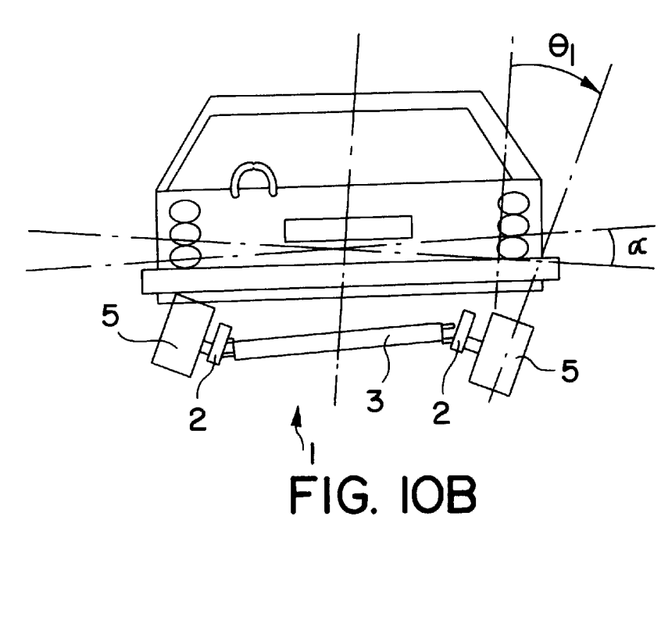
Figure 11A:
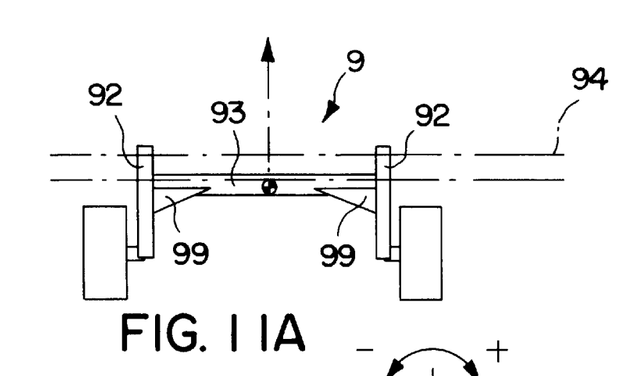
FIGS. 11A and 11B illustrate the torsional deformation of an axle according to the prior art.
Figure 11B:
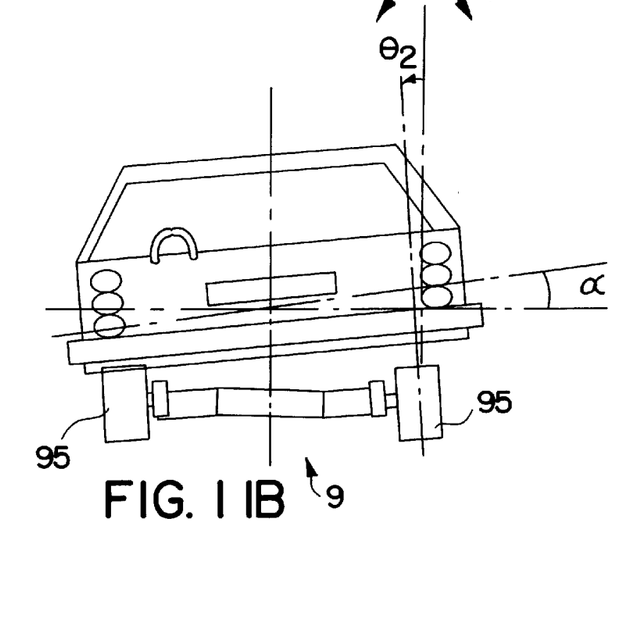

If it is particularly desired to operate on control of the wheel plane, that is, control the camber of the wheel on the road, the cross member is preferably offset from the ball joints connecting the arms to the body, as is represented, notably, in FIGS. 10 and 11. Let us note that, in this case, the arms 2 are each intended to be coupled to the body by a joint 4 on the body, which allows a disalignment of said coupling joints relative to each other. FIGS. 11A and 11B show an axle according to the state of the art, seen in plan view in FIG. 11A, the arrow in FIG. 11A pointing toward the front of the vehicle. Depending on the shift of the cross member 93 relative to the axis 94 of linkage to the body, this can result in an evolution of the wheel plane $\theta_2$, due to the torsion of the cross member 93 produced by a roll $\alpha$. However, this is never enough to prevent the wheel planes from being tilted toward outside the turn and, therefore, in a direction unfavorable to work of the tire. This is what can be seen in FIG. 11B, which shows that the wheels 95 are tilted toward the outside of the turn.

FIG. 10 represent the operation of an axle according to the invention upon a comparable stress. For a cross member of type 3E, the slit and link of which are arranged as represented on FIG. 7, one obtains an evolution of $\theta_1$ of much greater range and in a direction opposite that obtained for $\theta_2$ (see FIG. 11) for a same angle $\alpha$. That makes it possible to correct the position of the wheel plane 5 in order to maintain a zero camber at all times. It is even possible to obtain tilts toward the inside of the turn, as represented in FIG. 10B. The invention enables the tires to operate in a much more favorable configuration. Thus, by using a cross member whose section is open, one can choose the orientation of the cross member and position of the ball joint connecting the cross member to the arms so as to increase the variation of camber relative to a reference frame linked to the cross member, in relation to what is obtained with a torsion axle directly comparable and as known in the prior art. As has just been explained, the advantages of the invention include an application in which control of the wheel plane is mainly sought. The effects are all the greater as the cross member is farther away from the axis of coupling of the arms on the body (H-shaped torsion axle). But the invention is also of interest for other applications, for example, when weight gains of an axle are sought. A cross member, the shape of whose section makes it possible to obtain the torsion and bending properties sought, can be designed more easily than in the usual case of housings and whatever the material adopted for the cross member. From that standpoint, the invention is also of interest for cross members, whether offset or not (U-shaped torsion axle, in which the axis of the cross member is appreciably merged with the axis of coupling of the arms on the body).

One advantage of the invention is the fact that it allows wider angles of clearance of one arm from the other, because it allows greater torsion of the cross member without raising problems of housing. Hence, with given wheel suspension travel relative to the body of a vehicle, the suspension arms can be shorter, much shorter than is usually found in the case of torsion axles. The same arm length as found in suspensions with independent wheels and trailing arms can generally be adopted.

By making at least three ball joint type links at the interface between the cross member and the arms, stress concentrations can advantageously be avoided and the twisting of the geometry of the section can be used, in particular, to increase, whether linearly or not, the intrinsic torsional rigidity of the section. The bending strength in turn depends only on the structure of the section; it is far more advantageously uncoupled from the torsion. For the cross member, a tubular section can be used, with thickness constant or not, of open or closed type and, by the geometry of the section, the torsional rigidity and bending strength are mastered as desired, while in the state of the art said torsional rigidity and bending strengths depend also on the presence of reinforcements in the housing. The ball joints can be either of mechanical or elastic joint type. Their positions can also contribute to the elastokinematics of the wheel planes. In the case of elastic joints, the rigidity can be adjusted to obtain advantageous nonlinear effects.

Furthermore, the elimination of bending moment at the link between cross member and arms, because of the ball joints, makes possible a considerable reduction of stress concentrations and facilitates the use of shorter arms, thereby reducing the size of the axle and its weight. The distribution of stresses over the whole length of the section also allows for the use of materials other than steel (light alloys, composites, etc.) to reduce the weight of the assembly even more. One can, for example, use aluminum drawing, which makes it possible to obtain advantageously multiple shapes and an optimized distribution of material. The intrinsic torsional rigidity of the open or closed section can be modified and adjusted by its section and length characteristics through the choice of material. Many different shapes can be envisaged for the cross member section. The invention has been illustrated by a V-section, a U-section, a cross-shaped section and a C-section. A closed cylinder can be used, which is thin in relation to the space of its plane generating curve. The torsional rigidity of the open or closed tubular section can also be modified and adjusted by the judicious choice of rigidity of one or more of the ball joints between the cross member and the arms. The rigidity of the ball joints can be nonlinear, for the purpose of having the elastic kinematics of nonlinear wheel planes. That nonlinearity of rigidity can be obtained by geometric choices, shape factors and moduli of the materials. The location of installation of ball joints on the open or closed tubular section also has an influence on the elastic kinematics of the wheel planes and offers the designer an opportunity to adjust the characteristics of the axle.

As a feature of the invention, the plane of the wheel arms and variations of attitude of the latter as a function of dynamic stresses can be correctly mastered, which makes it possible to point and/or tilt (camber angle) the plane of the rear wheel toward the inside of the turn, by correctly choosing the location of the ball joint and positioning of the cross member section in relation to the suspension arm.

The invention is particularly applicable as rear assembly of a passenger vehicle. But it can have broader applications in any vehicle category, for the torsion characteristics sought and the steering precision of the wheel planes can be selectively and separately regulated.

We claim:

1. A torsion axle for a vehicle, said axle comprising two trailing arms, a cross member having a transverse axis parallel to the transverse direction of a vehicle, said cross member having a free edge at each of its lateral ends, said arms being connected to each of the ends of the cross member, each of said arms being designed to be attached to the body of the vehicle by a joint on the body, so as to define for each arm an axis coupling the arms on the body, each of said arms being designed to support a wheel, said cross member providing a torsion axis on which the arms swing in relation to each other, and at least three link means forming ball joints connecting the cross member to each of the arms and allowing twisting of said free edges of the cross member.

2. An axle according to claim 1, in which said link means comprise mechanical ball joints.

3. An axle according to claim 1, in which said link means comprise friction-free elastomer ball joints.

4. An axle according to claim 3, in which said elastomer ball joints are of variable rigidity, depending on their directions relative to a plane perpendicular to the axis of the cross member.

5. An axle according to claim 3, in which said elastomer joints are oriented so as to let their axes be moved with least stress relative to one another in directions along straight lines connecting them and in a plane perpendicular to the axis of the cross member.

6. An axle according to claim 1, in which at least one of the link means on at least one of the sides of the vehicle is mounted by an adjustment means for regulating the relative crosswise positioning of the arm or arms on the cross member, so as to be able to regulate the orientation of the plane of each wheel.

7. An axle according to claim 1, in which the cross member is formed by an open section, so that said cross member, seen in a plane perpendicular to its axis, presents a slit requiring a predetermined azimuth of the cross member on its axis in the linkage of said cross member to said arms.

8. An axle according to claim 7, in which, considering the forward and backward directions of the vehicle, as well as the directions toward the road and toward the top of the vehicle, the slit is directed toward the road, and two link means are located upward and one link means is located toward the road and backward.

9. An axle according to claim 7, in which the open section includes several closed sections connected together.

10. An axle according to claim 7, in which the open section is made from a flattened and deformed tube.

11. An axle according to claim 1, in which the cross member is offset from the joints connecting the arms on the body.

* * * * *